United States Patent

[11] 3,633,259

[72] Inventor Klaus Kalevi Nikanen
 Karhula, Finland
[21] Appl. No. 815,262
[22] Filed Apr. 4, 1969
[45] Patented Jan. 11, 1972
[73] Assignee A. Ahlstrom Osakeyhtio
 Noormarkku, Finland
[32] Priority Oct. 28, 1968
[33] Finland
[31] 3058/68

[54] COATING METHOD
 14 Claims, 5 Drawing Figs.
[52] U.S. Cl.................................................... 29/148.4 D,
 29/423, 29/447, 117/94
[51] Int. Cl.............................................................. B21d 53/12
[50] Field of Search........................................... 29/423,
 148.4 D, 473.3, 473.5, 527.2, 474.3, 447, 450,
 497.5, 481, DIG. 35, 130, 132, 190; 117/65.2, 94

[56] References Cited
UNITED STATES PATENTS

| 2,219,085 | 10/1940 | Watson | 29/148.4 |
| 2,544,455 | 3/1951 | Goulding | 29/148.4 |
| 2,765,526 | 10/1956 | Sparkes et al. | 29/527.2 X |
| 3,007,231 | 11/1961 | Garver | 29/148.4 |
| 3,098,285 | 7/1963 | Kelzenberg et al. | 29/148.4 |
| 3,156,986 | 11/1964 | White, Jr. | 29/148.4 X |
| 3,526,939 | 9/1970 | Nikkanen | 29/148.4 |

*Primary Examiner*—John F. Campbell
*Assistant Examiner*—Victor A. Di Palma
*Attorneys*—Lorimer P. Brooks, Alfred L. Haffner, Jr., Harold Haidt, G. Thomas Delahunty, Albert M. Parker and Charles G. Mueller ABSTRACT: The roller body to be coated is enveloped by a material layer which thereafter is enveloped with another surface layer, the surface layer being brought into fused condition, for instance, by welding and when cooling it causes the material layer to contract around the roller body, after which the surface layer can be removed.

COATING METHOD

BACKGROUND OF THE INVENTION

1. Field of the Invention

This invention relates to a coating method applicable for use in the preparation of rollers and similar machine elements which will be exposed to corrosive or abrasive materials and of which further is required a high degree of rigidity and/or strength.

The method is particularly suitable for the preparation of rollers for paper making and pulp machines such as grooved press rollers.

2. Description of the Prior Art

In applicant's U.S. Pat. No. 3,526,939 there is disclosed a method for preparing press rollers in which a roller body of great wall thickness is enveloped with a thin corrosion-resistant sheet, and additional material is welded on around said sheet, the additional material having the same composition as the sheet and, when cooled causes the sheet to contract around the roller body. This method, although practicable, however, suffers from certain limitations. The coating sheet must, for instance, consist of a readily weldable material. Since generally the welded-on additional material must be applied in ample proportions in order to provide the desired contraction effect, the method is relatively costly considering that a portion of the surface layer must be removed by machining to provide a smooth surface. When preparing rollers which by machining are to be provided with thin grooves, such as for improving drainage in press rollers for paper making and pulp machines, it is necessary to remove from the roller envelope not only the welded-on layer but also the underlaying layer which is subjected to crystal structure changes, because otherwise difficulties will be encountered in the preparation of the grooves. The method is not suitable for preparing thin coating layers, since the welding on in this case leads to difficulties.

In the prior art these types of rollers have been prepared, for instance, by casting. As a result of the great pressure force necessary for the provision of effective drainage, the diameter and wall thickness of the rollers must be great, and because of the squeezed-out liquid has a corrosive effect, the roller must be made of a corrosion-resistant material. In addition the surface of the roller will be exposed to a great compressive stress and therefore a great mechanical strength and abrasion resistance is required of the material. Consequently the preparation costs of a cast roller will be very high. In addition the microstructure of the cast roller frequently is unhomogenous, containing pores, hard points and other defects. It is difficult to machine the surface of such a roller to a smooth condition, and still more difficult to make the grooves in such a surface.

Various methods for coating rollers are prior known, for instance, from the U.S. Pat. No. 3,098,285, according to which the coating is prepared by the utilization of heating and rolling to bring forth a plastic deformation. This method requires great forces and special equipment, an is suitable only for preparing thin coatings. Another prior known method is disclosed in the U.S. Pat. NO. 2,219,085, according to which the coating is prepared by pressing portions of a sheet envelope against a roller body and thereafter by welding together the transversal sheet seams. In order to produce a reliable contraction bond between the envelope and the body, a great compression pressure is required, and a great amount of special tools are necessary for carrying out the method, wherefore it is not very practicable.

Further various methods are known in which the desired surface layer is produced by welding on additional material around the roller body, as disclosed, for instance, in the U.S. Pat. NO. 3,156,968, or around a separate envelope surrounding the roller body as disclosed in the U.S. Pat. No. 3,007,231. All methods involving the fusing of welding rod for the formation of the surface layer are uneconomical.

The object of the present invention is to provide a method by which the above-mentioned restrictions and drawbacks are avoided. The method is applicable for the preparation of both metallic and nonmetallic coatings. It permits the preparation of very thin coatings, of the order of 1mm. thickness, and relatively thick coatings, such as of 25 mm. thickness. The coating can comprise a helix, or a plurality of adjacent annuli, so as to make up a grooved roller.

SUMMARY OF THE INVENTION

The foregoing and other objects of the invention are achieved by the present invention wherein there is provided a coating method in which a layer consisting of a different material or a material of different composition, with the utilization of heat, is compressed around a body, comprising placing such a material layer around a body to cover it entirely or locally, thereafter surrounding said material layer by an envelope, converting the surface layer of said envelope to a fused state and thereafter permitting to cool, thereby bringing forth contraction of the material layer around the body, thereafter removing the envelope.

The advantage of the method consists in that it permits the utilization of various coating materials which do not need to be weldable. The consumption of the coating material which generally is expensive, is small, since no great machining tolerance is required. In steel materials no crystal structure changes occur as the temperature remains reasonable, so that the coating layer remains homogenous. The roller body may consist of a cheap nonweldable material such as cast iron. The outer envelope may consist of a cheap material such as common low-carbon steel. The method also permits the preparation of grooved rollers with inwardly expanding grooves, the provision of which by machining is practically impossible. Similarly it is possible to compress around the body one or more layers of perforated sheet, a method permitting simple manufacture of perforated press rollers for paper-making machines.

The invention is described more fully in the following with reference to the attached drawings in which several embodiments of the invention for the preparation of cylindrical press rollers are illustrated as examples. In the drawings:

FIG. 1 shows a longitudinal section of a press roller prepared according to the invention, FIG. 2 shows a cross section of the same, FIG. 3 is a partial view of a longitudinal section in greater scale, of a second press roller according to the invention, FIG. 4 is a partial view of a longitudinal section in greater scale, of a third press roller according to the invention, and FIG. 5 is a perspective view of a press roller manufactured according to the method of the invention, at an initial stage.

DESCRIPTION OF THE PREFERRED EMBODIMENTS

Figure 1:
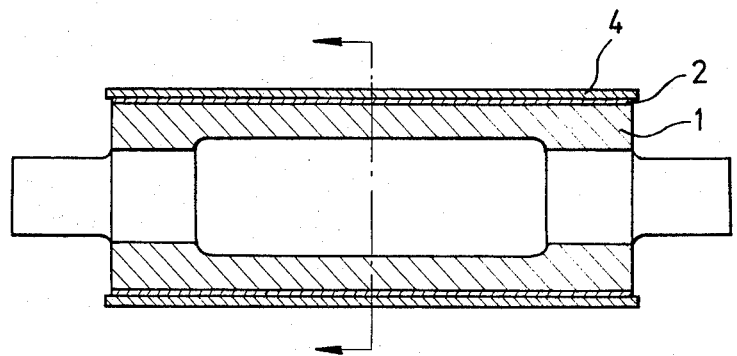
Figure 2:
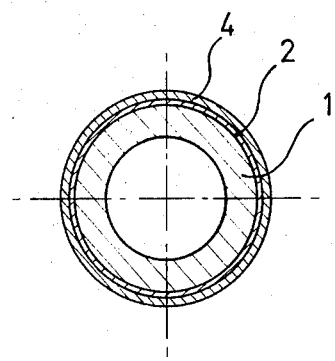
Figure 3:
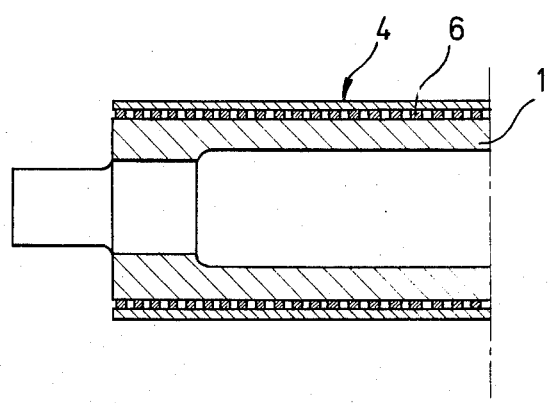

According to one embodiment of the invention the roller body 1 to be coated is enveloped by a thin-walled tube 2 or by sheets 3 bent around the roller body, the sheets then being welded together so as to form a tube, whereafter this tubular envelope is enveloped with another tubular envelope 4, the surface layer of which is brought into fused condition by welding on or other suitable means. When cooling, the outer envelope 4 causes the inner envelope 2 to contract around the roller body 1, whereafter the outer envelope 4 can be removed, for instance, by splitting it by sawing.

The fusing of the surface layer of the envelope can be effected, for instance, by having a torch axially moved along the envelope surface while the roller is rotating, but can also be effected by having the torch axially moved while the roller is stationary, after which the roller is rotated sufficiently to have the next following fusing zone located adjacent the one before.

The heat source can consist of a gas flame, an electric arc, a plasm flame, a laser or the like, capable of producing sufficiently high temperature and sufficient heat quantities for local fusing of the surface layer of the envelope.

According to another embodiment a material layer which may consist of metallic and/or nonmetallic material is sprayed on around the roller body and thereafter contracted by means of a surrounding envelope, the density and mechanical properties of said material layer being changed as a result of the heat treatment provided by the heat transferred from the envelope. The sprayed on material layer is generally porous and therefore does not provide protection against corrosion. Certain sprayed materials may be sintered under pressure, provided the temperature is sufficient, whereby they acquire density and strength.

According to another embodiment the roller body is enveloped with a spiral or a plurality of adjacent annuli of a contour strip 6 which are compressed around the roller body so as to provide a permanent contraction bond between the contour strip or the annuli and the roller body in the same manner as in the case of the preceding examples. In this manner it is possible to prepare grooved rollers very economically since it is not necessary to machine the grooves, which always is a time consuming and costly process.

Figure 4:
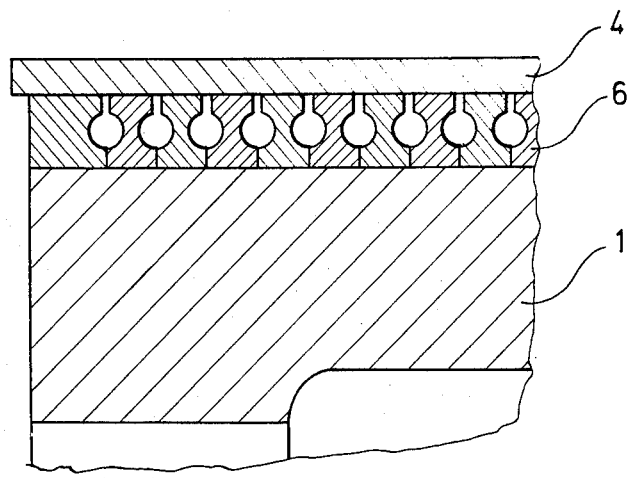
Figure 5:
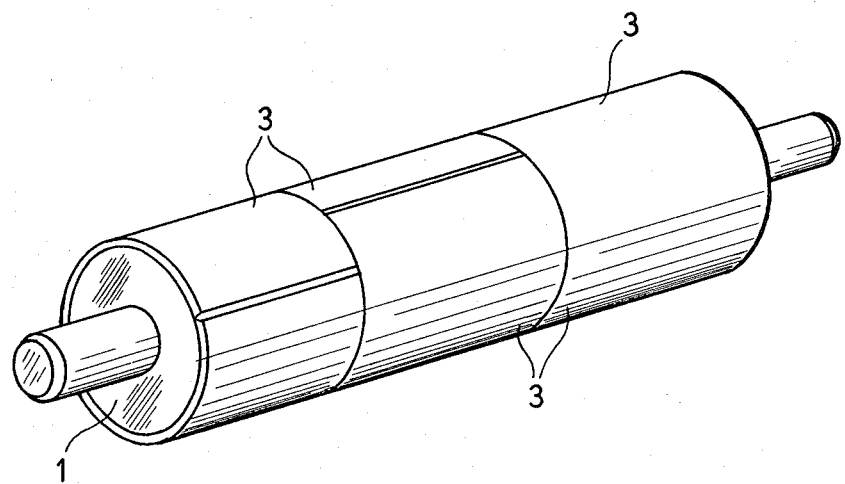

FIG. 4 depicts a grooved roller with inwardly expanding grooves formed by adjacent annuli of a contour strip 6 which are compressed around the roller body 1.

In experiments carried out the thickness of the material layer has ranged from 1 to 25 millimeters and the thickness of the tubular envelopes from 6 to 10 millimeters, but dimensions outside these limits are also contemplated. The method is applicable to other shapes such as bodies of quadrangular cross section with rounded edges.

I claim:

1. Coating method win which a layer of material is compressed into place around a generally cylindrical roll body, with the utilization of heat, comprising placing said material layer around the roll body to wrap the body, subsequently surrounding the material layer with an envelope of fusible metal, converting a surface layer of said envelope to a fused state and then permitting the envelope to cool, thereby causing contraction of the material layer around the roll body, and finally removing the envelope.

2. Method according to claim 1, said material layer consisting of a material different from that of the roll body and different from that of the envelope.

3. Method according to claim 1, said material layer consisting of a material differing in composition from the composition of the roll body and differing in composition from the envelope.

4. Method according to claim 1, wherein said wrapping of said body with said material layer completely encloses the cylindrical surface of the body.

5. Method according to claim 1, wherein said wrapping of said body with said material layer does not completely enclose the cylindrical surface of the body, leaving narrow grooving through said material layer.

6. Method according to claim 1, characterized in that the said material layer to be compressed around the said body consists of suitably spaced annuli.

7. Method according to claim 1, characterized in that the said material layer compressed around the said body consists of a helically advancing rod of material.

8. Method according to claim 1, wherein grooves which widen toward the said body are formed in said material layer by using for said wrapping of the body contoured strip material formed to provide such widening grooves between adjacent strip segments wrapped around the body.

9. Method according to claim 1, characterized in that the said material layer to be compressed around the said body consists of one or more perforated plates.

10. Method according to claim 1, wherein the envelope is of weldable material and including bringing the surface layer of the envelope into fused state by welding on the same.

11. Method according to claim 1, characterized by bringing the surface layer of the said envelope into fused state by means of gas flame.

12. Method according to claim 1, characterized by bringing the surface layer of the said envelope into fused state by means of an electric arc.

13. Method according to claim 1, characterized by bringing the surface layer of the said envelope into fusee state by means of a plasm flame.

14. Method according to claim 1, characterized by bringing the surface layer of the said envelope into fused state by means of a laser.

* * * * *